May 28, 1963 G. F. NADEAU ET AL 3,091,534
STRIPPING FILM FOR IMPROVED EMULSION
Filed Feb. 9, 1960

GALE F. NADEAU
CARL F. SMITH
CLEMENS B. STARCK
INVENTORS
BY R. Frank Smith
Harold N. Powell
ATTORNEYS

United States Patent Office 3,091,534

Patented May 28, 1963

3,091,534

STRIPPING FILM FOR IMPROVED EMULSION

Gale F. Nadeau, Carl F. Smith, and Clemens B. Starck, Rochester, N.Y., assignors to Eastman Kodak Company, Rochester, N.Y., a corporation of New Jersey Filed Feb. 9, 1960, Ser. No. 7,711
5 Claims. (Cl. 96—83)

Figure 1:
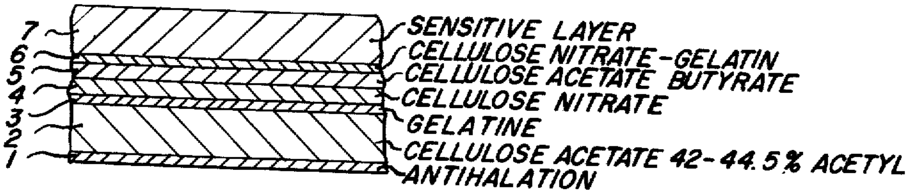

This invention relates to a stripping film. More particularly, this invention concerns a transparent stripping film base adapted to carry various light-sensitive layers thereon.

Stripping film products in general and their various uses are already described in the art. Usually such products in their generic make-up comprise a temporary base, the stripping or splitting layer or zone, a more permanent base and a sensitive layer. For example, several embodiments of stripping film are described in our earlier U.S. Patents Nos. 2,614,932, 2,266,435 and in Nadeau U.S. Patents Nos. 2,326,058 and 2,139,767. In the last mentioned Nadeau U.S. Patent No. 2,139,767, patented December 1938, the particular problem of desensitization or the like effect on the light-sensitive layer as caused by pH drop is discussed and a solution for that particular problem is set forth.

In Nadeau U.S. Patent No. 2,326,058, patented August 1943, stripping film is described wherein it is indicated that a high contrast emulsion may be used in that this may be advantageous in the copying of drawings. It is believed apparent from a consideration of the foregoing patents that stripping film may be used for a number of purposes and that it may be desirable to place a variety of light-sensitive layers on such stripping film support or base.

In more recent years in the manufacture of stripping film in some products it has been desired to apply different light-sensitive coatings or a wider range of such coatings or layers. In certain of the products the problem of variations in sensitometric properties was encountered when manufacturing a stripping film product of a certain configuration. That is, when it was attempted to product a stripping film of a make-up similar to a type of product which had been produced but using some of the currently available light-sensitive layers, it was found that such type layers might be adversely affected. Further investigation indicated this adverse effect was being caused by the stripping film base.

Accordingly, it is believed apparent that the development of an improved base which base is adapted to carry not only the type of sensitive layers heretofore used but which also functions satisfactorily with other sensitive layers, represents a highly desirable result.

After extensive investigation we have found how to prepare a novel transparent stripping film base having a combination of layers and physical properties much the same as the stripping film base currently used in the trade. However, our new base has the added advantage that it will carry various emulsion layers without the above-mentioned difficulties of the emulsion layer varying in sensitivity or becoming desensitized.

This invention has for a particular object to provide a new base for stripping film which base is adapted to carry various sensitive layers without desensitization thereof. Another object is to provide a stripping film base comprised of a certain combination of layers in a certain order. Still another object is to provide certain coating compositions which may be employed in preparing the new stripping film base of the type indicated. Still another object is to provide a method of manufacturing a stripping film of the class indicated. Other objects will appear hereinafter.

We have found that the desensitizing effect above referred to is caused by the cellulose nitrate layer or skin used in making the film base. In many instances it was not considered desirable to entirely eliminate the cellulose nitrate from the stripping film because this would change the mechanical properties such as the wet stripping properties and the like which stripping film users had become accustomed to. After considerable work on this subject we discovered that if the aforementioned cellulose nitrate layer in stripping films were partially replaced by or overcoated by a cellulose ester layer or skin and particularly a cellulose acetate butyrate layer, that the adverse effect of the cellulose nitrate layer may be minimized or eliminated.

That is, if between the cellulose nitrate skin or layer and the light-sensitive layer there is interposed a layer, such as a cellulose acetate butyrate layer, a new stripping film base is produced which has improved utility. In addition, this improvement is secured without the sacrifice of physical properties or material change in the physical properties as respects handling of the film or stripping the exposed layer from the film base.

Figure 2:
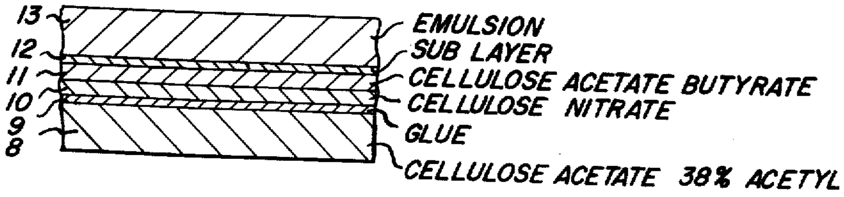

For assistance in a further understanding of this invention reference is made to the attached drawing forming a part of the present application. In the attached drawing:

FIG. 1 is a sectional view on an enlarged scale of one embodiment of the stripping film base in accordance with the present invention; and FIG. 2 likewise is a sectional view on an enlarged scale of another embodiment in accordance with the present invention.

Referring to FIG. 1, there is provided a support 2 which is comprised of high acetyl cellulose acetate, namely a cellulose acetate having an acetyl content of 42–44.5%. The support would preferably have on its outside surface an anti-halation pelloid 1. Such a layer is desirable to control the curl or flatness of the sheet and to provide antihalation properties. The standard gelatin pelloid containing either dyes or manganese dioxides as absorbent agents can be used for this purpose. A layer of gelatin 3 is carried on this acetate support. Positioned over the gelatin is a cellulose nitrate layer 4 which is combined with the cellulose acetate butyrate layer 5 of the present invention. Upon this cellulose acetate butyrate layer there is a cellulose nitrate-gelatin layer 6. The foregoing comprises the preferred base of the present invention. The desired light-sensitive layer may be carried on this base as shown at 7. This sensitive layer may be one as heretofore used or may be a layer that, for example, has wider latitude of exposure or the like than comparable layers heretofore used on stripping film bases. Illustrations of various sensitive layers which may be used will be set forth hereinafter.

Referring to FIG. 2, this figure is in general similar to the preceding figure excepting that the support 8 is comprised of a low acetyl cellulose ester such as acetone soluble cellulose acetate having for example 38% acetyl. Such base may be subbed and carry an antihalation layer. This base is overcoated with a glue layer 9. The cellulose nitrate 10, cellulose acetate butyrate 11 layers of the present invention are positioned in the order indicated so that the emulsion layer 13 may be positioned above the butyrate layer on cellulose nitrate-gel sub 12. In other words, as shown in the present invention there is interposed a cellulose acetate butyrate layer between the nitrate layer and the light-sensitive layer to be carried on the stripping film base.

In the broader aspects of our invention, the new stripping film base of the present invention may be formulated, coated out or otherwise prepared using the same apparatus and substantially similar procedures as those heretofore used in making stripping film as described in the patents to Nadeau and others referred to above. However, as pointed out above, there is interposed over the nitrate layer and between the nitrate layer and the emulsion a layer of cellulose ester, preferably cellulose acetate butyrate, applied from a suitable solvent. Such interposition of the acetate butyrate layer does not reduce or adversely affect the physical properties of the stripping film. However, such interposed acetate butyrate layer does prevent the remainder of the film composition from adversely affecting the overcoated emulsion layers 6 and 12. It is apparent, therefore, since the new composite base of the present invention is suitable for a variety of relatively highly sensitive emulsion coatings, that the instant invention would likewise be suitable for less sensitive emulsion coatings.

A further understanding of our invention may be had from a consideration of the following examples which are set forth to illustrate certain preferred embodiments.

*Example I*

In accordance with this example a product generally similar to that disclosed in FIG. 1 was prepared. A cellulose acetate film support of about 43% acetyl and of approximately .00520" to .00560" thickness was coated with gelatin. The composition of the gelatin coating materials applied was approximately as follows:

| | Percent |
|---|---|
| Gelatin | 3 |
| Glue | 3 |
| Glycerine | 9 |
| Water | 85 |

In addition, sufficient saponin and thymol are added for spreading and preservation of the solution. The ratio of gelatin to glue may be altered in order to change the wet stripping time of the final product. The manner of coating the gelatin was by emulsion coating apparatus. The apparatus and procedure for carrying out the foregoing may be generally in accordance with the prior art.

There was then applied to the gelatin layer a cellulose nitrate coating of the following composition:

| | Percent |
|---|---|
| Cold washed cellulose nitrate | 4–5 |
| Methyl Cellosolve | 15 |
| Solvesso xylol | 5.3 |
| Acetone | 74.7–75.7 |

This cellulose nitrate coating was of approximately .00015" thickness.

There was then applied the cellulose acetate butyrate coating of the present invention consisting of the following composition:

| | Percent |
|---|---|
| Cellulose acetate butyrate (apparent actyl 40.1%, acetyl 29.5%, butyryl 17.5%) | 4–5 |
| Methyl Cellosolve | 15 |
| Solvesso xylol | 5.3 |
| Acetone | 74.7–75.7 |

These coatings were applied by roll coating procedure and the use of a roller bead application technique.

The xylol indicated as Solvesso is that sold by Esso Standard Oil Company.

The new stripping film base of the present invention prepared as above described was given a thin sub of cellulose nitrate-gelatin and then overcoated with a currently available light-sensitive silver halide emulsion applied by conventional procedure. The stripping film product produced in accordance with this example was subjected to conventional physical and photographic tests and results of these tests indicated that there was no densitization or variation in the sensitometric properties. Also, the stripping properties of the film were satisfactory.

*Example II*

In accordance with this example the procedures and combinations were the same as in Example I except that the temporary support was changed. In this particular example a cellulose acetate transparent support of approximately 38% acetyl was coated with a glue layer. Such support may be subbed with cellulose nitrate-gelatin or other suitable sub. The composition used to coat the glue layer was as follows:

| | Percent |
|---|---|
| Glue | 2 |
| Glacial acetic acid | 1 |
| Methanol | 15 |
| Water | 82 |

Then the cellulose nitrate-cellulose acetate butyrate layers of the present invention were applied. This cellulose ester layer was subbed and a light-sensitive emulsion layer was applied thereover.

Tests of this stripping film product of this example were carried out as stated under Example I and results of these tests, both physical and photographic, were satisfactory.

*Example III*

This example was generally similar to the preceding examples in that a transparent cellulose acetate temporary support was used. However, this support was coated with a mixture of gelatin and glue, preferably of about a 30:70 ratio, to provide the stripping layer or zone between the cellulose acetate support and the cellulose nitrate-cellulose acetate butyrate layer. The resultant stripping film base was overcoated with a light-sensitive layer as in the preceding examples. Tests indicated that the light-sensitive layer was not adversely affected by the base and that the product had good stripping qualities.

*Example IV*

This example was generally the same as Example I excepting that the cellulose nitrate and the cellulose acetate butyrate (in the amount of about 4–5%) were deposited from a solvent of the following composition:

| | Percent |
|---|---|
| Water | 5 |
| Acetone | 55 |
| Butyl acetate | 35–36 |

A satisfactory stripping film base was obtained using these different solvents.

*Example V*

This example was comparable to Example IV excepting that the cellulose nitrate-cellulose acetate butyrate layers of the present invention were applied by roller bead application from another solvent combination. That is, 4–5% each of the cellulose nitrate and cellulose acetate butyrate were dissolved in a liquid of the following composition:

| | Percent |
|---|---|
| n-Butyl alcohol | 5 |
| Solvesso xylol | 5.3 |
| Acetone | 74.7–75.7 |

The resultant stripping film base compared favorably with the bases prepared in the other examples.

*Example VI*

The following example will serve to illustrate in further detail that our new base does not adversely affect the sensitive layer applied thereto. The sensitometric results listed below are for film samples obtained by coating a silver chlorobromide emulsion in the ratio of 65% silver chloride to 35% silver bromide, containing the normal antifoggants, hardeners, coating aids, etc., as will be discussed in further detail hereinafter, and optically sensitized with a maximum at about 560 mμ. The emulsion was coated on, in one case, a support containing a cellulose nitrate skin and in the other case, on the laminated cellulose nitrate cellulose-acetate butyrate base of the present invention as already described above.

The emulsion was coated to yield a silver coverage of 372 mg. silver/sq. ft. and a gelatin coverage of 425 mg. gelatin/sq. ft. The emulsion layers were overcoated, in each case, with a gelatin layer coated at 91 mg. gelatin/sq. ft.

A sample of each coating was exposed on an Eastman 1*b* sensitometer and processed for the time indicated in a commercial developer known in the trade as Kodalith Developer, fixed, washed and dried with the following results:

| Coating number | 1¾′ Developer | | | | 2¼′ Developer | | | | 2¾′ Developer | | | | 3¼′ Developer | | | |
|---|---|---|---|---|---|---|---|---|---|---|---|---|---|---|---|---|
| | Relative speed | Effective contrast | Fog | Dot quality | Relative speed | Effective contrast | Fog | Dot quality | Relative speed | Effective contrast | Fog | Dot quality | Relative speed | Effective contrast | Fog | Dot quality |
| 49 (Fresh) | 219 | 5.8 | .01 | 2 | 309 | 5.3 | .01 | 1 | 372 | 4.5 | .02 | 1 | 417 | 3.45 | .02 | 1 |
| 49 (1 wk. incubation, 120 F., 50% RH) | 159 | 4.6 | .08 | 3 | 282 | 4.4 | .22 | 1 | 331 | 3.4 | .31 | 1 | 324 | 2.75 | .39 | 1 |
| 50 (Fresh) | 100 | 6.2 | .01 | 7 | 155 | 8.2 | .01 | 7 | 214 | 10.4 | .01 | 4 | 263 | 8.6 | .01 | 1 |
| 50 (1 wk. incubation, 120 F., 50% RH) | 87 | 5.4 | .03 | 6 | 151 | 6.4 | .05 | 6 | 224 | 5.6 | .17 | 4 | 316 | 4.3 | .37 | |

It can be seen from the above results that the emulsion coated on the split skin (50) of the present invention has much higher contrast, better dot quality and better stability on incubation than the coating on the nitrate skin (49). Dot quality is a measurement of the quality of screen dots in processed photographic silver halide coatings. The dots are compared with given reference standards when viewed through a comparison microscope at a magnification of 210×. Quality numbers range from 1, which is poor, to 10, which is excellent.

While the above examples illustrate certain preferred embodiments of our invention, as apparent, certain changes may be made therein such as in the solvent mixtures used in depositing both the cellulose nitrate and cellulose acetate butyrate or the concentration of these cellulose compounds may be varied somewhat. That is, where a .0003″ total thickness of both skins is indicated, this may vary from .000225″ to .00035″. The gelatin or glue layer may be of a thickness between .00015″ to .00030″. While cellulose acetate butyrate is preferred, other cellulose esters as cellulose acetate, cellulose propionate, cellulose butyrate and the like may be used. In certain of the above examples, in place of the saponin spreading agent, the thymol agent, stabilizing agent and the like other similar agents may be used.

As indicated above the particular light-sensitive layer which may be coated over the cellulose acetate butyrate (preferable subbed surface) of our new stripping film base is not a limitation on the present invention inasmuch as a large variety of light-sensitive compositions may be applied. In general we would prefer to use a photographic emulsion of the developing out type. In more detail and as already indicated above, our new base is particularly useful where the emulsion contains speed increasing compounds and/or compounds which increase the exposure latitude or the like. Such compositions are described in a number of existing patents.

It can be seen from the foregoing that we have provided a relatively simple economical procedure for preparing an improved transparent stripping film base which has particular utility in that it may carry a variety of relatively sensitive emulsions on the butyrate surface thereof.

The invention has been described in detail with particular reference to preferred embodiments thereof, but it will be understood that variations and modifications can be effected within the spirit and scope of the invention as described hereinabove and as defined in the appended claims.

We claim:

1. A stripping film comprised of
(1) a cellulose acetate temporary support,
(2) a stripping layer selected from the group consisting of glue and gelatin on one surface of said temporary support,
(3) a composite permanent support on the stripping layer consisting of
(*a*) a cellulose nitrate layer and
(*b*) a cellulose acetate butyrate layer, said cellulose nitrate layer being positioned adjacent and on a surface of the stripping layer, and
(4) a light-sensitive silver halide emulsion layer on said composite permanent support.

2. A stripping film comprised of
(1) a cellulose acetate temporary support,
(2) a stripping layer of glue on one surface of said temporary support,
(3) a composite permanent support on the stripping layer consisting of
(*a*) a cellulose nitrate layer and
(*b*) a cellulose acetate butyrate layer, said cellulose nitrate layer being positioned adjacent and on the surface of the stripping layer,
(4) a light-sensitive silver halide emulsion layer on said composite permanent support, and
(5) a subbing layer disposed between the permanent support and the light-sensitive silver halide emulsion layer.

3. A stripping film comprised of
(1) a cellulose acetate temporary support,
(2) a stripping layer of gelatin,
(3) a composite permanent support on the stripping layer consisting of
(*a*) a cellulose nitrate layer and
(*b*) a cellulose acetate butyrate layer, said cellulose nitrate layer being positioned adjacent and on a surface of the stripping layer,
(4) a light-sensitive silver halide emulsion layer on said composite permanent support, and
(5) a subbing layer disposed between the light-sensitive silver halide emulsion layer and said composite permanent support.

4. A stripping film in accordance with claim 1 wherein the cellulose acetate temporary support carries an antihalation layer on its outer surface.

5. A stripping film in accordance with claim 1 wherein the temporary support is a transparent cellulose acetate having an acetyl content of 42% to 44.5%.

References Cited in the file of this patent

UNITED STATES PATENTS

| | | |
|---|---|---|
| 2,140,648 | Nadeau | Dec. 20, 1938 |
| 2,143,791 | Nadeau | Jan. 10, 1939 |
| 2,258,997 | Nadeau | Oct. 14, 1941 |
| 2,319,102 | Albers et al. | May 11, 1943 |
| 2,614,932 | Nadeau et al. | Oct. 21, 1952 |

FOREIGN PATENTS

| | | |
|---|---|---|
| 167,383 | Australia | Oct. 16, 1952 |

UNITED STATES PATENT OFFICE

CERTIFICATE OF CORRECTION

Patent No. 3,091,534 May 28, 1963

Gale F. Nadeau et al.

It is hereby certified that error appears in the above numbered patent requiring correction and that the said Letters Patent should read as corrected below.

Column 1, line 42, for "product" read -- produce --; column 3, line 70, for "densitization" read -- desensitization --.

Signed and sealed this 31st day of December 1963.

SEAL)
Attest:
ERNEST W. SWIDER

Attesting Officer

EDWIN L. REYNOLDS

Acting Commissioner of Patents